United States Patent
Shinbo

(10) Patent No.: US 12,328,535 B2
(45) Date of Patent: Jun. 10, 2025

(54) PROJECTION DEVICE, DISPLAY SYSTEM, AND DISPLAY METHOD

(71) Applicant: SEIKO EPSON CORPORATION, Tokyo (JP)

(72) Inventor: Akira Shinbo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 203 days.

(21) Appl. No.: 18/156,398

(22) Filed: Jan. 19, 2023

(65) Prior Publication Data

US 2023/0239442 A1   Jul. 27, 2023

(30) Foreign Application Priority Data

Jan. 21, 2022   (JP) .................. 2022-007691

(51) Int. Cl.
| | |
|---|---|
| H04N 9/31 | (2006.01) |
| G03B 15/08 | (2021.01) |
| G06T 7/70 | (2017.01) |
| G06V 10/12 | (2022.01) |
| G06V 10/22 | (2022.01) |
| G06V 20/00 | (2022.01) |
| H04N 5/04 | (2006.01) |
| H04N 5/74 | (2006.01) |

(52) U.S. Cl.
CPC ............ *H04N 9/3179* (2013.01); *G06T 7/70* (2017.01); *G06V 20/00* (2022.01); *H04N 9/3173* (2013.01)

(58) Field of Classification Search
CPC .. H04N 9/3179; H04N 9/3173; H04N 9/3194; H04N 1/00251; H04N 5/7491; H04N 5/04; G06T 7/70; G06T 7/73; G06V 20/00; G06V 10/12; G06V 10/225; G06V 20/20; G03B 15/08

See application file for complete search history.

(56) References Cited

U.S. PATENT DOCUMENTS

| | | | |
|---|---|---|---|
| 6,839,061 B1* | 1/2005 | Kamakura | G06F 3/1446 345/520 |
| 2007/0177013 A1* | 8/2007 | Shingu | H04N 23/66 348/143 |
| 2008/0150913 A1* | 6/2008 | Bell | G06F 3/042 345/175 |

(Continued)

FOREIGN PATENT DOCUMENTS

JP   2012-212345   11/2012

*Primary Examiner* — Marly S Camargo
(74) *Attorney, Agent, or Firm* — JCIPRNET

(57) ABSTRACT

A projection device includes a camera that captures an image of a real space in which an object is disposed and a projector that projects an image indicated by video data generated based on the captured image by the camera onto an image capturing region of the camera in the real space. The video data is, for example, a pointing image such as an arrow or a finger point pointing to an object disposed in the real space. The projection device detects the object by image recognition from the captured image and generates video data for displaying a pointing image pointing to the object at a position superimposed on or adjacent to the object. When the image indicated by the video data generated is projected from the projector, the pointing image is displayed at a position superimposed on or adjacent to the object in the real space.

13 Claims, 10 Drawing Sheets

(56) References Cited

U.S. PATENT DOCUMENTS

| | | |
|---|---|---|
| 2012/0250940 A1 | 10/2012 | Kasahara |
| 2014/0253511 A1* | 9/2014 | Yagishita .............. G06F 3/0425 |
| | | 345/175 |
| 2019/0121522 A1* | 4/2019 | Davis ..................... G06V 40/28 |
| 2020/0265838 A1* | 8/2020 | Koperwas ................. G06T 7/11 |
| 2020/0368616 A1* | 11/2020 | Delamont ............ H04N 13/239 |
| 2022/0206292 A1* | 6/2022 | DeWall ............. G02B 27/0025 |
| 2024/0179390 A1* | 5/2024 | Lo ........................ G06V 40/161 |

* cited by examiner

PROJECTION DEVICE, DISPLAY SYSTEM, AND DISPLAY METHOD

The present application is based on, and claims priority from JP Application Serial Number 2022-007691, filed Jan. 21, 2022, the disclosure of which is hereby incorporated by reference herein in its entirety.

BACKGROUND

1. Technical Field

The present disclosure relates to a projection device, a display system, and a display method.

2. Related Art

JP-A-2012-212345 describes a terminal device that includes an image capturing unit that captures an image of a real space, and a display unit. A control unit of the terminal device executes an AR application, and displays an output image in which a virtual object is superimposed on an input image on the display unit using an image captured by the image capturing unit as the input image.

In the terminal device of JP-A-2012-212345, an image of the real space is captured, an object appearing in the captured image is detected by image recognition, and a virtual object associated with the detected object is superimposed on the captured image and displayed. Examples of the object include a sketch of a station guide signboard, an exit guide, and a timetable. In addition, the terminal device includes an input unit such as a touch sensor, a mouse, a module that recognizes gestures and lines of sight, and motion of the virtual object displayed on the display unit is manipulated based on user input from the input unit.

In the terminal device disclosed in JP-A-2012-212345, a display unit of a terminal display is used to view a display in which a virtual object is superimposed on a captured image of a real space. A smartphone, a PC, a game terminal, or the like is used as the terminal device. In addition, a head-mounted display (HMD) may also be used as the display unit, but in any case, a user must hold or wear some kind of device. Thus, in order for a plurality of users to see the display without inconvenience, terminal devices and HMDs corresponding to a plurality of users are required, and each of the users must operate the device. Therefore, the plurality of users cannot easily share the display of the virtual object.

SUMMARY

In order to solve the above-described problems, a projection device according to the present disclosure includes a camera that captures an image of a real space in which an object is disposed, and a projector that projects an image that is generated based on the image captured by the camera and that includes information about the object in an image capturing region of the camera in the real space.

A display system according to the present disclosure includes a first device including a camera and a projector, and a second device configured to communicate with the first device, wherein the second device receives, from the first device, a captured image of a real space in which an object is disposed captured by a camera, and generates video data for projecting an image including information about the object based on the captured image, and the first device receives the video data from the second device, and projects the image onto an image capturing region of the camera in the real space by the projector.

A display method of the present disclosure includes a first step of capturing, with a camera, an image of a real space in which an object is disposed, a second step of generating video data for projecting an image including information about the object based on the captured image captured in the first step, and a third step of projecting the image by the projector onto an image capturing region of the camera in the real space.

DESCRIPTION OF EXEMPLARY EMBODIMENTS

Hereinafter, a projection device, a display system, and a display method according to an embodiment of the present disclosure will be described with reference to the accompanying drawings.

1. Display Method

Figure 1:
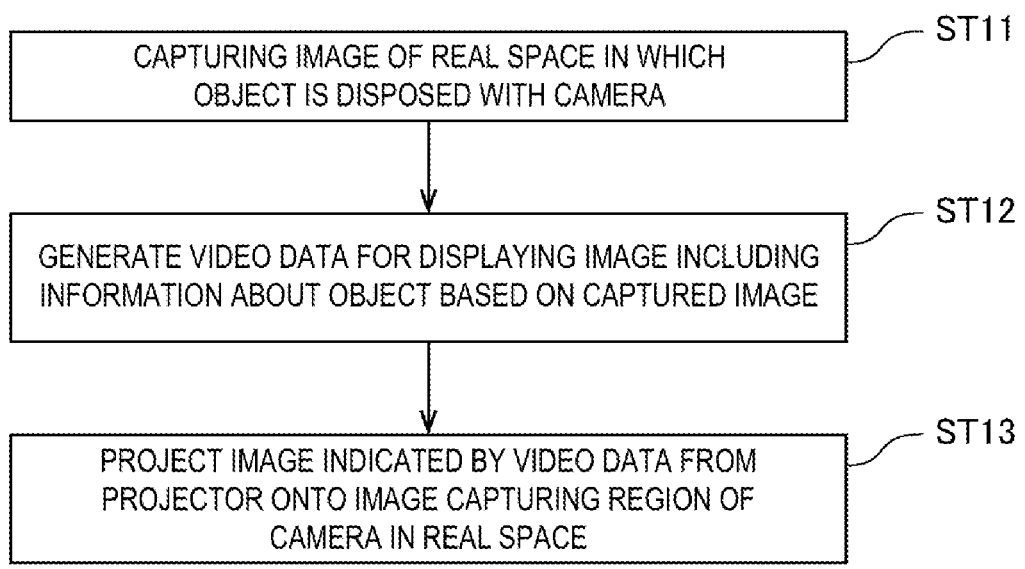
FIG. 1 is a flow chart of a display method to which the present disclosure is applied.

FIG. 1 is a flowchart of a display method to which the present disclosure is applied. First, with reference to FIG. 1, the outline of the display method to which the present disclosure is applied will be described. As will be described below, the projection device and the display system to which the present disclosure is applied include a camera that captures an image of a real space and a projector that projects images including video in the real space. The display method to which the present disclosure is applied displays various images in the real space by projecting images including video in the real space. At this time, the video to be projected is generated each time based on the captured image of the real space. The image to be displayed can be any image. For example, a figure, a pattern, text, and the like can be displayed. A display mode may be a still image, or may be a moving image.

As illustrated in FIG. 1, the display method to which the present disclosure is applied includes performing Step ST11 (a first step), Step ST12 (a second step), and Step ST13 (a third step). In Step ST11, an image of a real space in which an object is disposed is captured by a camera of the projection device or the display system. In Step ST12, video data for displaying an image including information of the object in the real space is generated based on the captured image captured by the camera in Step ST11. In Step ST13, an image indicated by the video data generated in Step ST12 is projected from the projector of the projection device or the display system onto an image capturing region of the camera in the real space. Thus, an image including information about the object is displayed in the real space. The projection device synchronizes a timing of projection by the projector with a timing of capturing an image by the camera. In the case of an installation type projection device, when the timing of capturing and the timing of projection are synchronized so that they are different, the object can be easily detected, and deterioration in the quality of the projected image can also be curbed.

In Step ST12, the object is detected by image recognition from the captured image of the real space to generate video data for projecting images for presenting information about the object to a user. In Embodiment 1 described below, video data for projecting a pointing image pointing to a position of the detected object into the real space is generated. In this case, in Step ST12, a position of displaying the pointing image is determined based on the position of the object in the image capturing region. For example, a projection position of the pointing image is a position adjacent to the detected object, or a position superimposed on the detected object. Furthermore, Step ST11 can be triggered by an input of input information about the object. In this case, in Step ST12, the object is detected from the captured image based on the input information.

In Step ST13, an image represented by the generated video data is projected from the projector onto a range superimposed on the image capturing region of the camera in the real space. In this way, the image for presenting information to the user is directly displayed on a surface of the object in the real space so that the user can directly see the image together with the object itself.

Known augmented reality (AR) display is a method for presenting information desired to be recognized by the user by superimposing various images in a screen for an image of the real space displayed on the screen of the terminal, but the display method according to the present disclosure provides information desired to be recognized by the user by superimposing the image directly on the surface of the object in the real space. Therefore, the user can directly see images presented on the surface of the object in real space without using display screens. In this way, since the display device and the installation thereof are not required as in the known AR display, a plurality of users can easily share information about the real space. In addition, since the display images are generated each time based on the captured image obtained by capturing an image of the real space, even when there is no map information in which the arrangement of the object in the real space is registered in advance, display corresponding to the arrangement of the actual object in the real space can be performed. Therefore, convenience is high. Furthermore, accurate display can be performed, and effective display can be performed.

2. Projection Device

Embodiment 1

Figure 2:
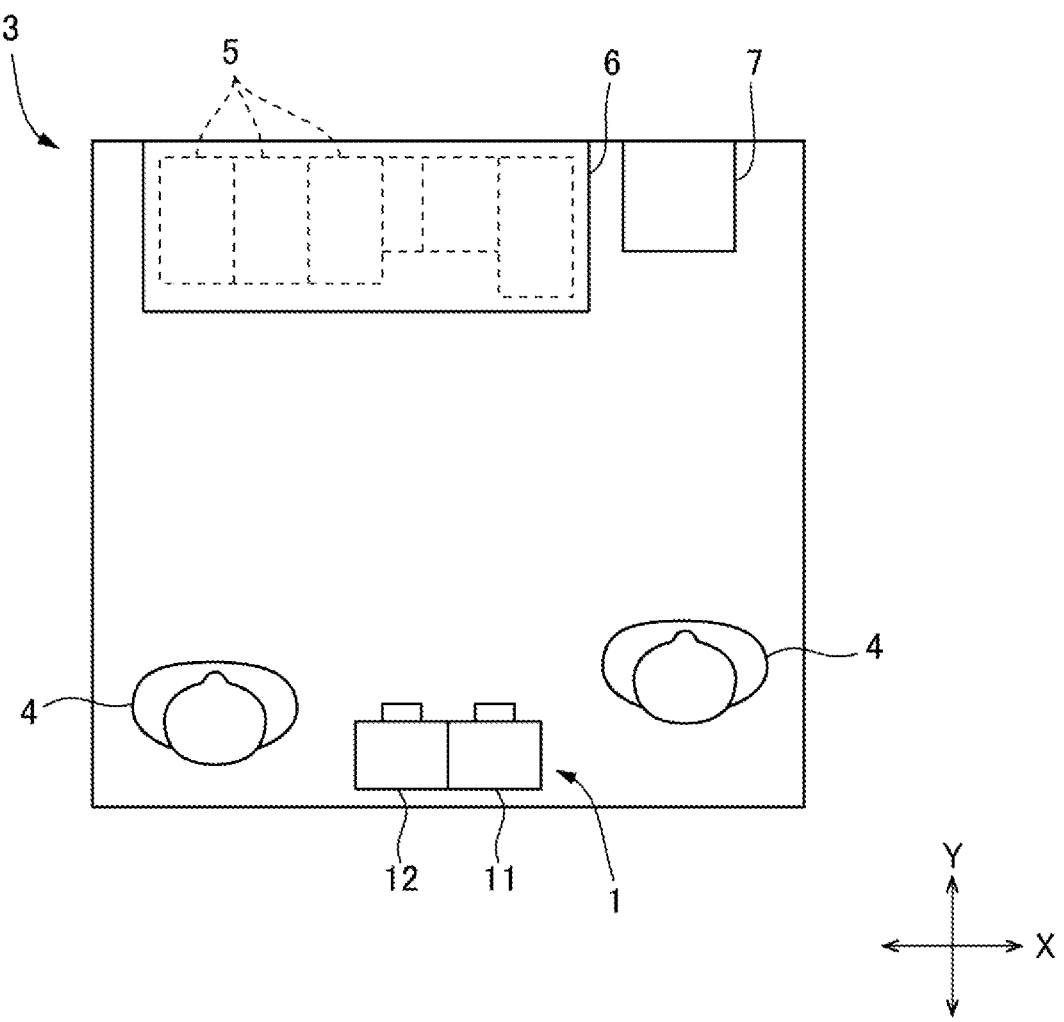
FIG. 2 is a plan view schematically illustrating a state in which a projection device of Embodiment 1 is installed in a real space.

FIG. 2 is a plan view schematically illustrating a state in which the projection device 1 of Embodiment 1 is installed in a real space 3. In the drawings of this specification, three directions of X, Y, and Z are mutually orthogonal directions. The X direction is a right-left direction (a width direction) of the real space 3, the Y direction is a forward-rearward direction (a depth direction) of the real space, and the Z direction is a vertical direction (a height direction) of the real space 3. The projection device 1 may have any mode of a mode in which it is used by being installed in the real space 3, and a mode in which it is a portable device used while the user 4 is carrying it. FIG. 2 illustrates a mode in which the projection device 1 is installed in the real space 3.

Figure 3:
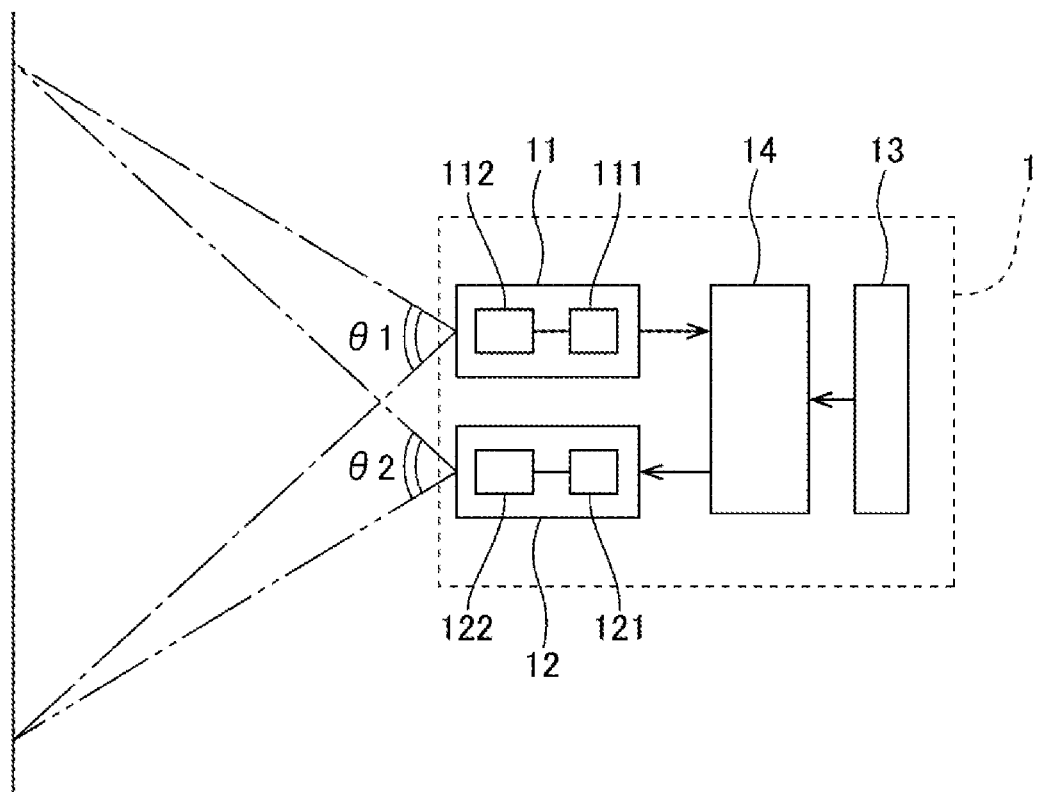
FIG. 3 is a block diagram illustrating a functional configuration of the projection device according to Embodiment 1.

FIG. 3 is a block diagram showing a functional configuration of the projection device 1 according to Embodiment 1. The projection device 1 includes a camera 11, a projector 12, an input unit 13, and a video data generation unit 14. The camera 11 includes an image capturing element 111 and an optical system 112, captures an image of the real space 3, and outputs the captured image. The projector 12 includes a projection optical system 122 and an image forming unit 121, and projects video data generated by the video data generation unit 14. The input unit 13 receives an input from the user 4. For example, an input device for performing a voice input, a touch panel, a pen tablet, or the like can be used as the input unit 13. In addition, various input means included in a general-purpose terminal device may be used as the input unit 13.

The captured image of the camera 11 and input information input from the input unit 13 are input to the video data generation unit 14. A function of the video data generation unit 14 is realized by a processor such as a CPU executing a display program read from a storage unit such as a non-volatile memory or HDD. The video data generation unit 14 generates video data based on the input information from the input unit 13 and the captured image of the camera 11. The video data generation unit 14 determines a position at which the image should be displayed with respect to the user 4 in the real space 3, and generates video data in which the image to be displayed at the determined position is disposed. The image forming unit 121 forms an image indicated by the video data generated. The image formed by the image forming unit 121 is enlarged and projected by the projection optical system 122, and is formed on a projection target in the real space 3, and thus the image is displayed. In the embodiment, the display of the image may be described simply as "the projector 12 projects video data".

For example, the video data generation unit 14 determines a display position at which the image should be displayed in an image capturing region R1 of the camera 11 based on the image captured by the camera 11, converts the display position in the image capturing region R1 into a display position in a projection region R2 of the projector 12, and generates video data in which the image is disposed in the display position in the projection region R2.

As illustrated in FIG. 3, in the projection device 1, an image capturing angle θ1 of the camera 11 and a projection angle θ2 of the projector 12 are substantially the same. The camera 11 and the projector 12 are disposed to face the same side. In Embodiment 1, the image capturing region R1 (refer to FIG. 6) of the camera 11 and the projection region R2 (refer to FIG. 7) of the projector 12 are configured to substantially coincide with each other. Therefore, the projector 12 projects a video in the image capturing region R1 of the camera 11. Here, in the example illustrated in FIG. 2, the camera 11 and the projector 12 are arranged left and right, but the camera 11 and the projector 12 may be stacked vertically. The projection device 1 is used at a position at which a distance to an object disposed in the real space 3 is within a projection distance of the projector 12. In such an arrangement, the video projected from the projector 12 is formed on a surface of the object in the real space 3.

Figure 4:
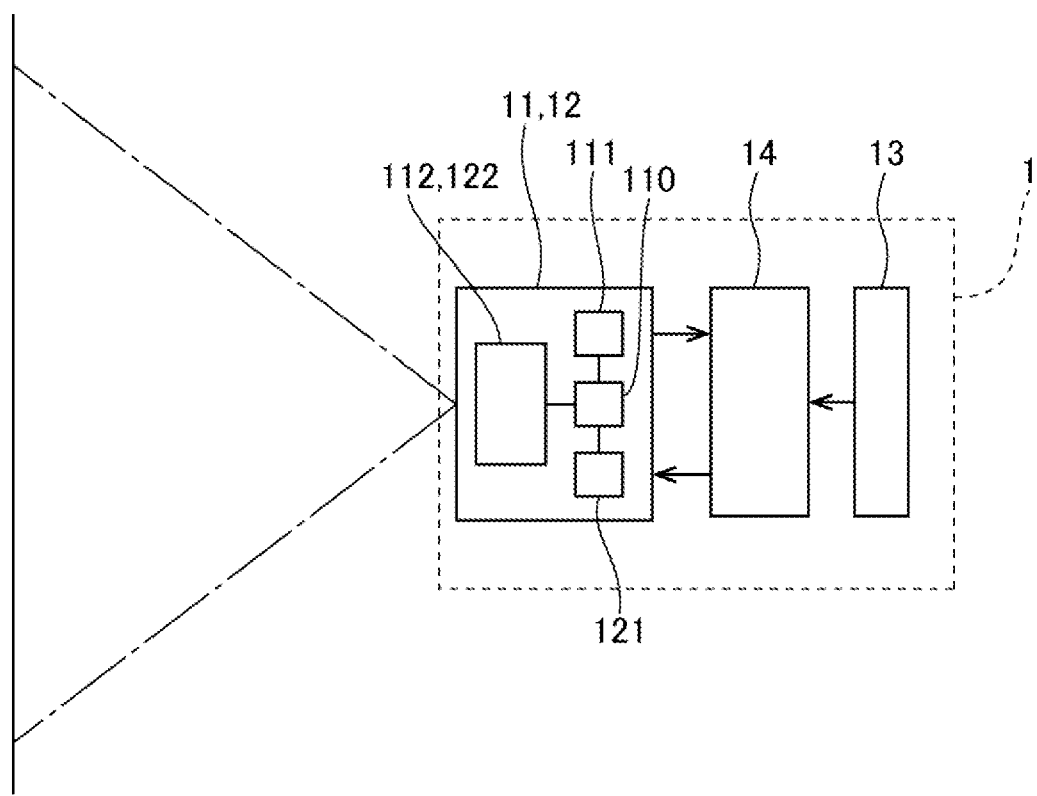
FIG. 4 is a block diagram illustrating the functional configuration of the projection device when an optical system of a camera and a projection optical system of a projector are common.
Figure 5:
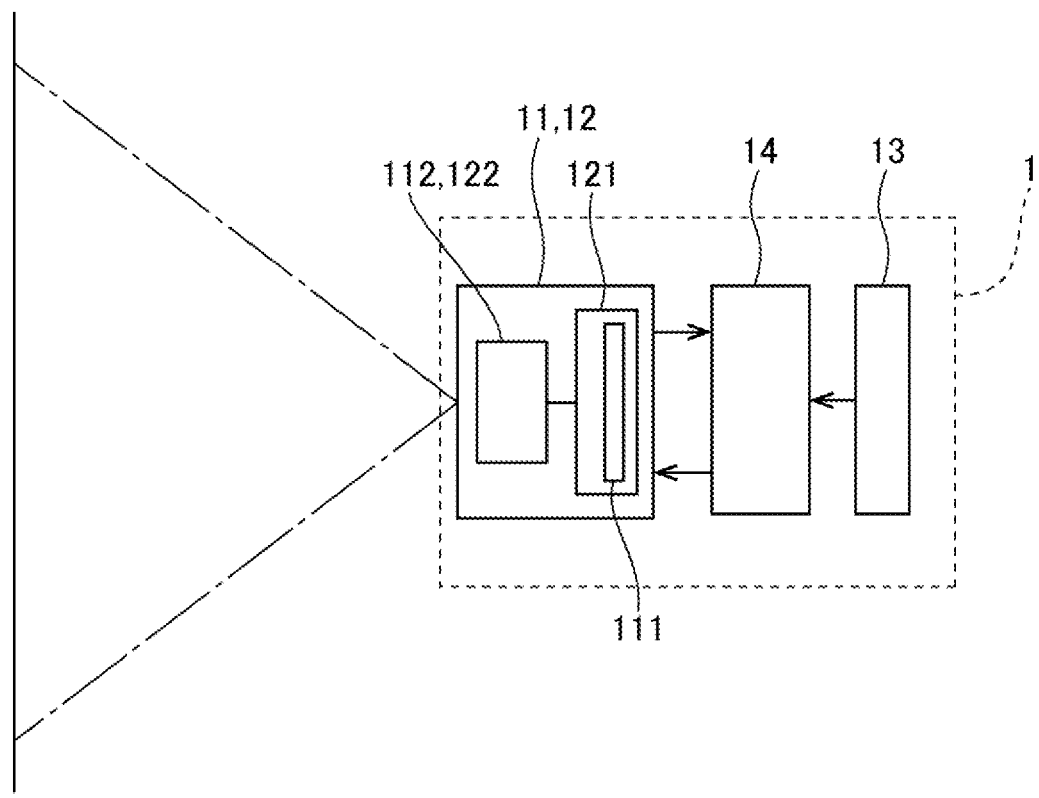
FIG. 5 is a block diagram illustrating a functional configuration of a projection device 1 when an image capturing element of the camera is disposed in an image forming unit of the projector.

Additionally, the image capturing angle θ1 and the projection angle θ2 can be made the same by making the optical system 112 of the camera 11 and the projection optical system 122 of the projector 12 common, and thus the image capturing region R1 and the projection region R2 can coincide with each other. FIG. 4 is a block diagram illustrating a functional configuration of the projection device 1 when the optical system 112 of the camera 11 and the projection optical system 122 of the projector 12 are common. The configuration of FIG. 4 is a configuration in which light from the common optical system 112, 122 is incident on the image capturing element 111 and light from the image forming unit 121 is emitted to the optical system 112, 122 by a separation optical element 110. FIG. 5 is a block diagram illustrating a functional configuration of the projection device 1 when an image capturing element 111 is disposed on the image forming unit 121 of the projector 12. The configuration of FIG. 5 is a configuration in which the image forming unit 121 is configured of a self-light-emitting imager including a light-emitting element, and the image capturing element 111 and the light-emitting element are stacked or formed on the same surface in the image forming unit 121.

Display Mode of Image in Real Space

Figure 6:
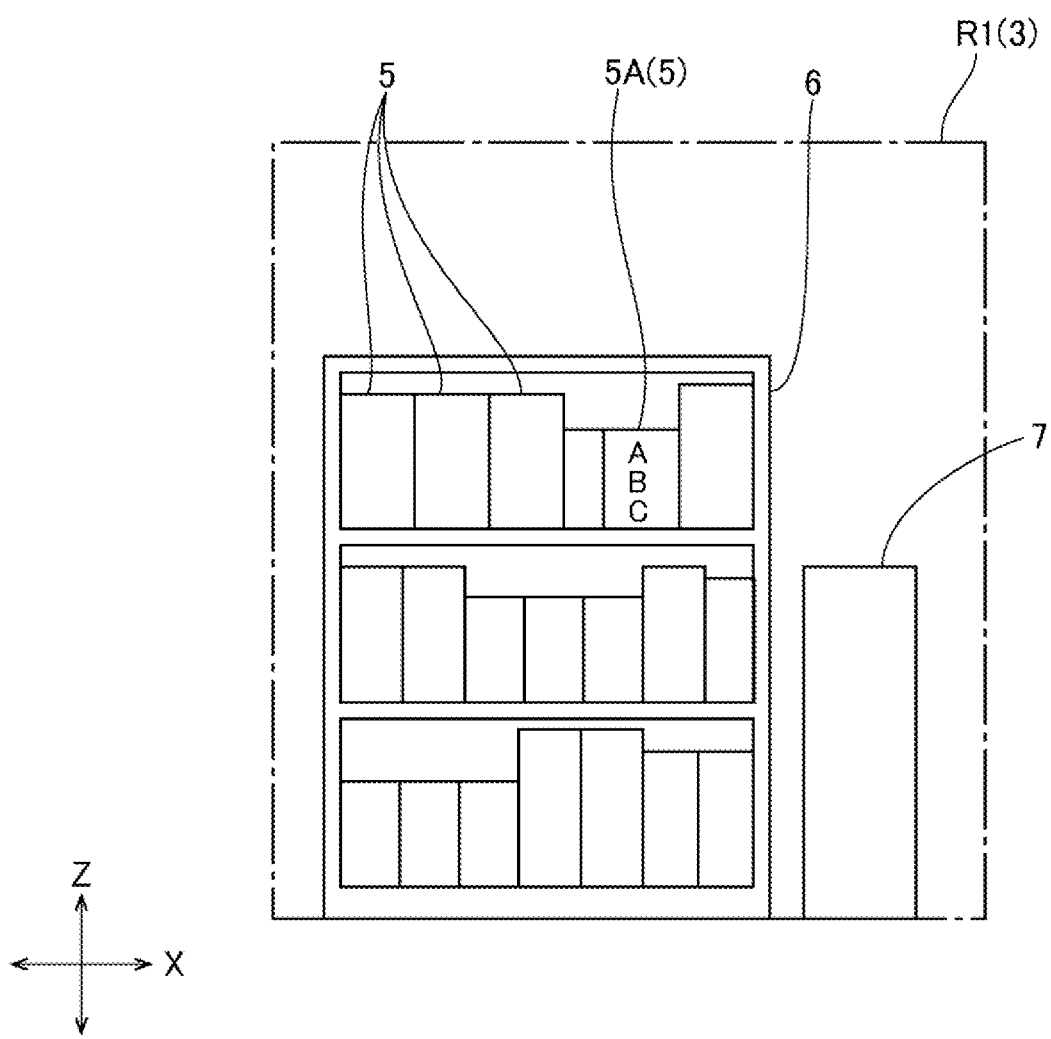
FIG. 6 is a front view illustrating a region imaged by a camera.
Figure 7:
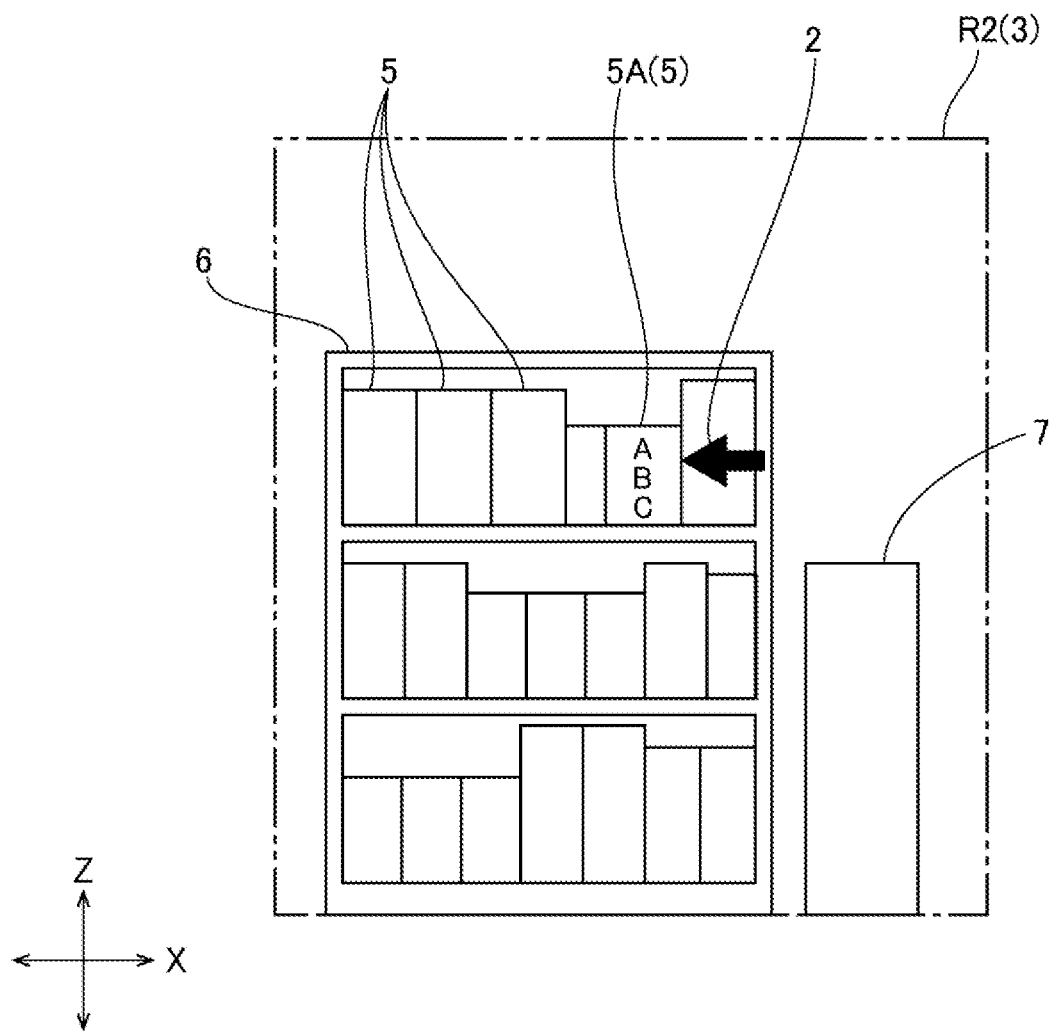
FIG. 7 is a front view illustrating a projection region in which a pointing image is projected.

FIG. 6 is a front view illustrating the image capturing region R1 of the camera 11. FIG. 7 is a front view illustrating the projection region R2 into which the pointing image 2 is projected. FIGS. 6 and 7 are front views of the real space 3 illustrated in FIG. 2 from the user 4 side. The projection device 1 displays the pointing image 2 pointing to a position of an object disposed in the real space 3, on the real space 3. As illustrated in FIG. 6, objects 5, 6, and 7 are disposed in the image capturing region R1 of the camera 11 in the real space 3. In the example illustrated in FIGS. 2, 6, and 7, the object 5 is a book, and the object 6 is a bookshelf. Also, the object 7 other than the book and the bookshelf is disposed. A plurality of books (the object 5) is disposed on the bookshelf (the object 6).

In the example illustrated in FIG. 7, the pointing image 2 is an image of an arrow, and is displayed pointing to one of the plurality of books (hereinafter referred to as an object 5A). Specifically, the pointing image 2 is displayed in a manner in which a tip end faces the side of the object 5A at a position adjacent to the object 5A.

Any image used as the pointing image 2 pointing to the position of the object 5A is set in advance in the display program executed by the video data generation unit 14. The video data generation unit 14 reads out data of the image used as the pointing image 2 from the storage unit and generates video data. The video data generation unit 14 determines an orientation and a display position of the pointing image 2 (the arrow) based on input information output from the input unit 13, and the captured image of the camera 11. Then, the video data in which the pointing image 2 is disposed at the determined display position is generated.

For example, the video data generation unit 14 detects a book with a title that matches the input information by image recognition in the captured image captured by the camera 11 based on an input of the title "ABC" of the book as the input information. In the example illustrated in FIG. 6, the object 5A is detected as the book with a title that matches the input information. Then, video data in which the pointing image 2 is disposed at a position pointing to the detected object 5A is generated. For example, video data in which the pointing image 2 of which the tip end is directed toward the object 5A is disposed at a position adjacent to the object 5A is generated. At this time, the video data is generated on the assumption that the image capturing region R1 and the projection region R2 substantially coincide with each other.

Figure 8:
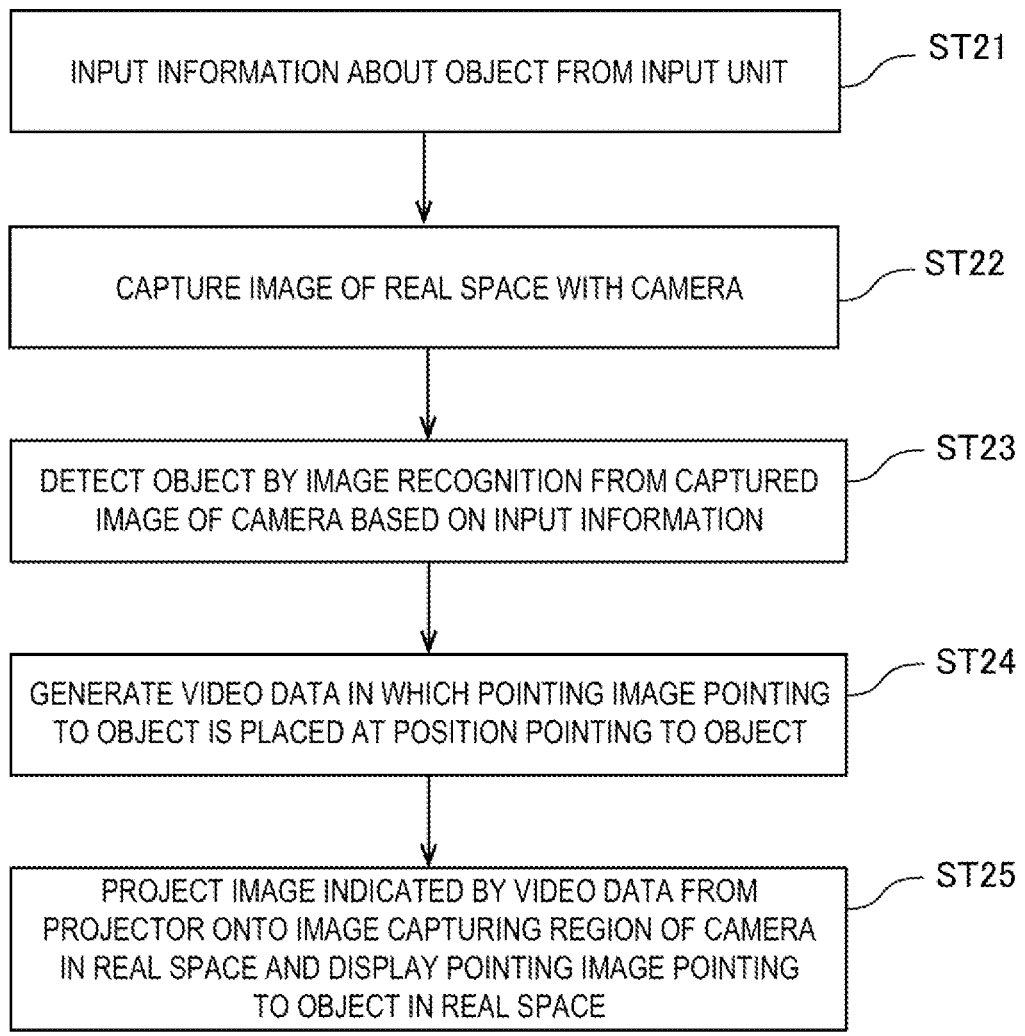
FIG. 8 is a flow chart illustrating a specific example of the display method by the projection device of Embodiment 1.

FIG. 8 is a flowchart illustrating a specific example of the display method by the projection device 1 of Embodiment 1. The flowchart of FIG. 8 includes a first step (Step ST22) of capturing an image of the real space 3 with the camera 11, a second step (Steps ST23 and ST24) of generating video data for displaying an image (the indication image 2) including information of the object 5A in the real space 3 based on the captured image, and a third step (Step ST25) of projecting the image indicated by the video data generated in the second step from the projector 12 onto the image capturing region R1 of the camera 11 in the real space 3 and displaying the image (the pointing image 2) including the information of the object 5A.

In the display method of FIG. 8, first, in Step ST21, an input of input information about an object is received from the input unit 13. In Step ST22, an image of the real space 3 is captured by the camera 11 using the input information input from the input unit 13 as a trigger. Next, in Step ST23, the title "ABC" is retrieved by image recognition in the captured image, and the object 5A is detected. In Step ST24, video data in which the pointing image 2 is disposed at a position pointing to the detected object 5A is generated. Subsequently, in Step ST25, the image indicated by the video data generated in Step ST24 is projected by the projector 12 to the image capturing region R1 of the camera 11 in the real space 3. Thus, the pointing image 2 pointing to the object 5A is displayed at the position pointing to the object 5A in the real space 3.

Main Actions and Effects of Projection Device of Embodiment 1

As described above, the projection device 1 of Embodiment 1 includes a camera 11 that captures an image of the real space 3 in which an object is disposed, and a projector 12 that projects an image that is generated based on the image captured by the camera 11 and includes information about the object onto the image capturing region R1 of the camera 11 in the real space 3.

The projection device 1 of Embodiment 1 performs each of the steps illustrated in FIG. 8 and displays an image in the real space 3. Thus, the user 4 can directly see the image presented on the surface of the object in the real space 3 without using a display device. Therefore, the display device and the installation thereof are not required as in the known AR display, and the plurality of users 4 can easily share the information about the object in the real space 3. In addition, since the image to be displayed is generated each time based on the captured image obtained by capturing the image of the real space 3, even when there is no map information in which the arrangement of the object in the real space 3 is registered in advance, the display corresponding to the arrangement of the actual object in the real space 3 can be performed. Therefore, convenience is high. Furthermore, accurate display can be performed, and effective display can be performed.

In the projection device of Embodiment 1, the projection angle θ2 of the projector 12 and the image capturing angle θ1 of the camera 11 coincide with each other. When the video data for the projector 12 is generated based on the captured image of the camera 11, since the video data can be generated on the assumption that the image capturing region R1 and the projection region R2 coincide with each other, the video data can be easily generated. Additionally, it is possible to causing the image capturing region R1 of the camera 11 to coincide with the projection region R2 of the projector 12 and to present information about all objects that can be detected from the captured image of the camera 11 to the user.

In the projection device 1 of Embodiment 1, as illustrated in FIGS. 4 and 5, a configuration in which the projection optical system 122 of the projector 12 and the optical system 112 of the camera 11 are common can be employed. Thus, the image capturing angle of the camera 11 and the projection angle of the projector 12 can be the same, and the image capturing region R1 and the projection region R2 can coincide with each other.

In the projection device 1 of Embodiment 1, the image projected by the projector 12 includes the pointing image 2 pointing to the object 5A disposed in the image capturing region R1. Displaying the pointing image 2 can give the user 4 useful information for finding object 5A. In Embodiment 1, as illustrated in FIG. 7, the pointing image 2 is projected to a position adjacent to the object 5A. Accordingly, the object 5A can be easily found.

The projection device 1 of Embodiment 1 includes the video data generation unit 14 that generates video data for projecting an image. The video data generation unit 14 performs Step ST23 and ST24 in FIG. 8. That is, the position of the object 5A in the image capturing region R1 of the camera 11 is detected, the position for projecting the pointing image 2 is determined based on the detected position, and the video data is generated. For example, video data for projecting the pointing image 2 is generated at a position superimposed on or adjacent to the object 5A. Since the projection device 1 includes the video data generation unit 14, the projection device 1 alone can generate necessary video data and can project an image. Thus, the projection device 1 can be used in a location at which there is no communication network. In addition, since the position of the object 5A is confirmed from the captured image and the display position of the pointing image 2 is determined, the display position of the pointing image 2 is accurate.

The projection device 1 of Embodiment 1 includes the input unit 13 that receives an input of information used for generating video data. The video data generation unit 14 detects the object 5A by image recognition from the captured image of the camera 11 using the input information input from the input unit 13 in Steps ST23 and ST24 of FIG. 8. Therefore, since the user 4 can input information about a necessary object (for example, a title of a book) on the spot and can display the pointing image 2 pointing to the position of the necessary object, convenience is high.

The projection device 1 of Embodiment 1 includes the projector 12 including a self-light-emitting imager. The self-light-emitting imager is a display panel including a light-emitting element for each pixel. Thus, a size of the projection device 1 can be reduced, and an installation space can be reduced. Also, it is suitable for use in a portable manner.

Embodiment 2

Figure 9:
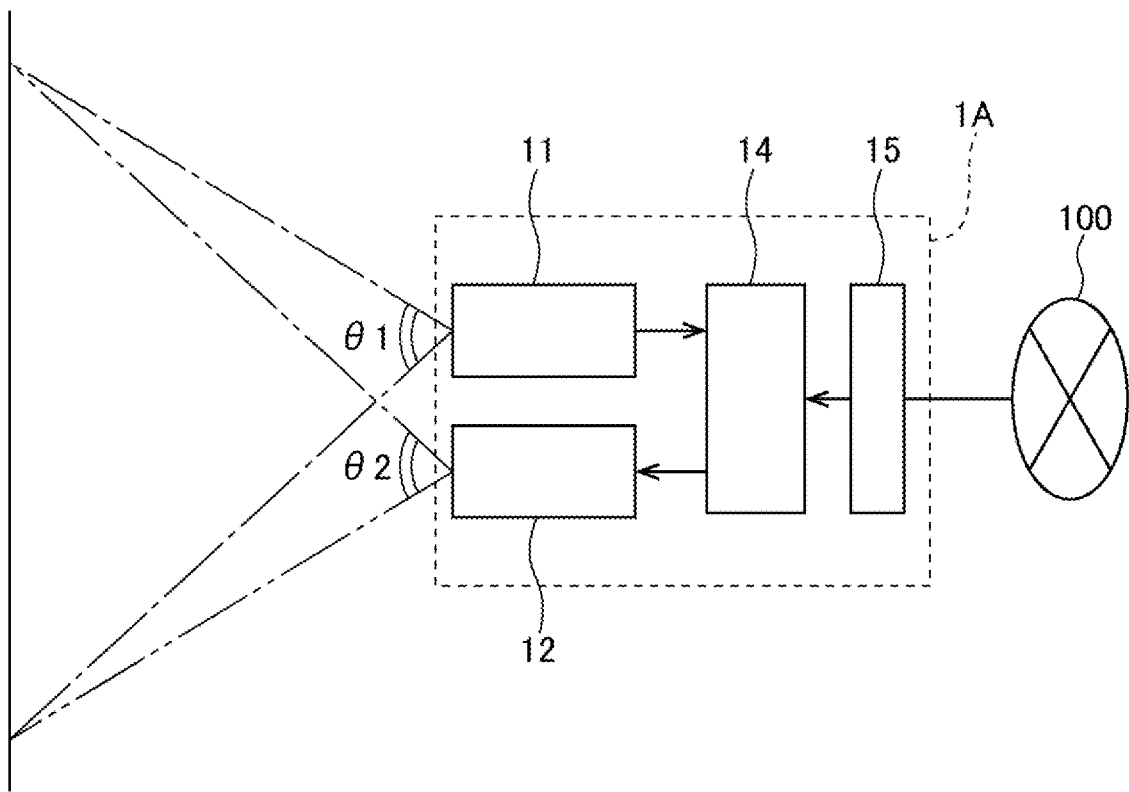
FIG. 9 is a block diagram illustrating a functional configuration of a projection device according to Embodiment 2.

FIG. 9 is a block diagram illustrating a functional configuration of a projection device 1A of Embodiment 2. The projection device 1A includes a camera 11, a projector 12, a video data generation unit 14, and a communication unit 15. The projection device 1A communicates with a terminal device (not illustrated) via the communication unit 15 and a network 100. The projection device 1A is installed in the real space 3 as in Embodiment 1. Alternatively, it can be carried and used by the user 4. The projection device 1A captures an image of the real space 3 in which the object is disposed with the camera 11 using reception of the input information from the terminal device as a trigger. Then, the projection device 1A generates video data based on the input information and the captured image of the camera 11, and projects an image indicated by the video data in the real space 3. The image indicated by the video data is an image including information about an object. As the terminal device for transmitting input information, a terminal device such as a smartphone or a tablet terminal owned by the user 4 can be used. Alternatively, it may be a device of an administrator who manages the real space 3.

The configuration of the camera 11 and the projector 12 is the same as that in Embodiment 1. Further, the video data generation unit 14 generates video data including the pointing image 2 based on the input information and the captured image of the camera 11, as in Embodiment 1. Therefore, in the same manner as in Embodiment 1, the pointing image 2 can be displayed in the real space 3, and thus the same actions and effects as those in Embodiment 1 can be obtained.

In Embodiment 2, when the input information is input from a terminal device of the user 4, the user 4 can input information of the object that he/she wants to find and can display the pointing image 2. On the other hand, when the input information is input from a terminal device at a location different from the real space 3, information about a position of an object desired to be recognized by the user 4 can be displayed from the projection device 1 by remote control. For example, when the real space 3 is a warehouse, and the user 4 is a worker who performs a picking operation in the warehouse, an administrator can input information about an object to be picked from an external terminal device and can display a position of the object to be picked in the warehouse. In this case, the external terminal device may be controlled by a computer rather than by a human administrator.

Mode of Pointing Image

In a mode illustrated in FIG. 7, an arrow is used as the pointing image 2, but a finger pointing image can be used instead of the arrow. If the finger pointing image is used, the finger pointing image is disposed at a position adjacent to the object 5A so that a tip end of the finger points toward the object 5A, similarly to the arrow. Alternatively, an image of a character pointing to the object 5A with a finger may be used as the pointing image.

Further, the pointing image 2 is not limited to being displayed at a position adjacent to the object 5A. For example, an image superimposed on the object 5A may be displayed to indicate the position of the object 5A. For example, a graphic having the same shape as the object 5A is superimposed on the object 5A as the pointing image. Alternatively, as the pointing image, a frame-shaped graphic surrounding an external shape of the object 5A is superimposed on the object 5A.

The pointing image 2 may be a still image, but may be a moving image. For example, a graphic superimposed on the object 5A is blinked in a predetermined pattern According to this mode, the pointing image can be prominent. Alternatively, the pointing image 2 is a moving image of an arrow that moves toward the object 5A and stops at a position pointing to the object 5A. According to this mode, the pointing image 2 can be prominent, and the position of the object 5A can be easily found.

In a mode illustrated in FIG. 6, an image projected by the projector 12 is only one pointing image 2, but two or more pointing images can be displayed. For example, when titles of multiple books are included in the input information, positions of the multiple books are detected, and the pointing image 2 is displayed at each of the positions. Alternatively, when multiple shelves are disposed in the real space, an image for highlighting a bookshelf in which the books to be retrieved are arranged may be displayed in combination with the pointing image 2 pointing to the book.

When an object corresponding to the input information is not detected from the captured image, the video data generation unit 14 may display that the object cannot be found. For example, text or a mark indicating that the object is not found may be projected. Thus, the pointing image 2 includes not only an image such as an arrow, but also an image of the additional information related to the object 5A represented by letters, marks, or the like.

Display Modes in Other Applications

Although the display mode illustrated in FIG. 7 displays the pointing image 2 for the purpose of allowing the user 4 to find the object 5A, the projection device 1, 1A may be used for other applications. For example, an intrusion of a suspicious person can be detected by image recognition from the captured image of the camera 11, and a warning can be displayed. As the video data for warning display, for example, video data in which a strong light is emitted to a suspicious person can be used, and a bright image is projected on the suspicious person.

Also, the projection device 1, 1A can be used for alerting the user. As an example of alerting, a change in the object arrangement is detected from the captured image of the camera 11, and when the object disappears, an alerting image is displayed at that position. In this case, the pointing image may be displayed, or an alerting image different from the pointing image may be used.

Alternatively, directing display can be performed using the projection device 1, 1A. For example, objects 5, 6, and 7 are detected from the captured image of the camera 11, and display position of a directing image is determined according to the arrangement of the objects 5, 6, and 7 in the real space 3. Alternatively, it is displayed in which the directing image moves according to the arrangement of the objects 5, 6, and 7. The directing image may be, for example, a character image.

In addition, although FIG. 2 illustrates an installation type projection device 1, a size reduction and portability of the projection device 1 can be facilitated using a self-luminous imager as the image forming unit 121. In this case, although the projection angle of the projection device 1 may not be increased, the projection angle and the image capturing angle can easily coincide with each other, and only the information of the object required for the user 4 can be displayed in the real space. The portable projection device 1 synchronizes a timing of the projection of the image by the projector 12 with a timing of capturing an image by the camera 11, and the projector 12 projects an image including information of the object, when the object is included in the captured image generated for each capturing by the camera 11.

For example, when the object is a product on display, the projection device 1, 1A can project additional information thereof. Furthermore, in the case of a portable projection device 1, it is possible to display the additional information about only the product to which the projection device 1 is directed by the user 4 in real space.

In addition, when the object is a part before assembly, the projection device 1, 1A can project a work procedure moving image such as assembly of the part. When there is a plurality of parts, a part for which the work procedure moving image is to be projected may be selected by the portable projection device 1.

Additionally, when the object is an aspect of a question format, the projection device 1, 1A can project an answer to a question. When there is a plurality of aspects, the user can selectively project the answer to the question by the portable projection device 1. For example, "an object is an aspect of a question format" is a piece of paper or the like on which characters or graphics expressing the question are written.

Display Direction Adjustment Function

In the projection device 1, 1A, the camera 11 and the projector 12 may be configured such that an image capturing direction of the camera and a projection direction of the projector 12 can be shifted while a state in which the image capturing region R1 of the camera 11 and the projection region R2 of the projector 12 substantially coincide with each other is maintained. For example, an adjustment mechanism that causes the image capturing direction of the camera and the projection direction of the projector 12 to be shifted while they are interlocked to maintain a state in which the image capturing region R1 and the projection region R2 substantially coincide with each other can be provided. Thus, display can be performed in an optimal range according to a size of the real space 3 and the arrangement of the object in the real space 3.

3. Display System

Embodiment 3

Figure 10:
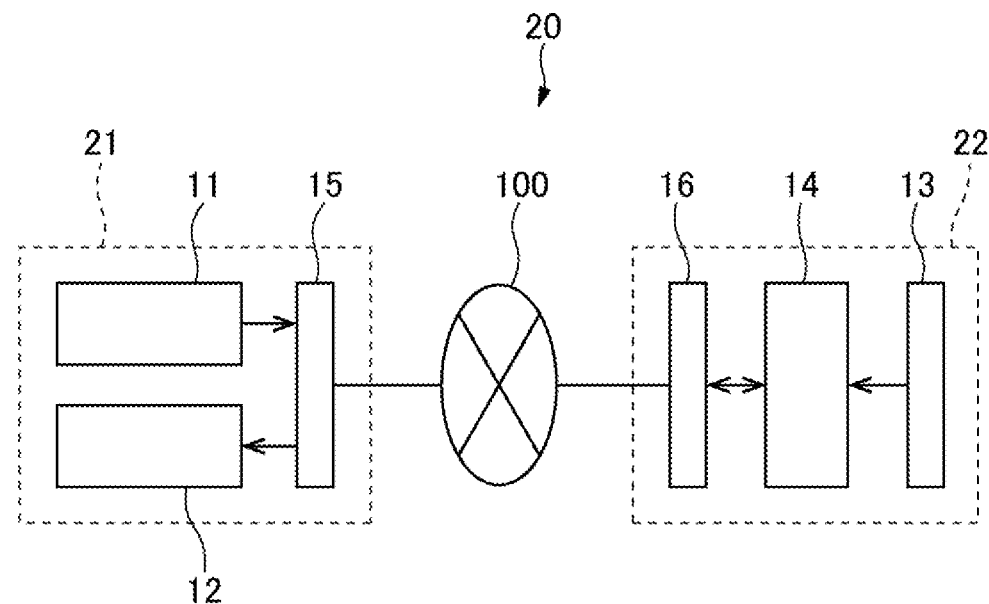
FIG. 10 is a block diagram illustrating a functional configuration of a display system according to Embodiment 3.

FIG. 10 is a block diagram illustrating a functional configuration of a display system 20 of Embodiment 3. The display system 20 includes a first device 21 and a second device 22. The first device 21 is a projection device installed in the real space 3, or a projection device carried by a user and used in the real space 3. The second device 22 is capable of communicating with the first device 21 via the network 100.

The first device 21 includes a camera 11, a projector 12, and a communication unit 15. The camera 11 and the projector 12 are configured similarly to those in Embodiment 1. The second device 22 includes an input unit 13, a video data generation unit 14, and a communication unit 16. As the second device 22, for example, a general-purpose personal computer can be used. When a general-purpose personal computer is used, a keyboard and a mouse can be used as the input unit 13. Also, similarly to Embodiment 1, a voice input device, a touch panel, a pen tablet, and the like can be used as the input unit 13.

As in each of the above embodiments, the display system 20 may perform a first step of capturing an image of the real space 3 in which an object is disposed with the camera 11, a second step of generating video data for projecting an image including information about the object based on the captured image, and a third step of projecting the image indicated by the video data from the projector 12 onto the image capturing region R1 of the camera 11 in the real space 3 and displaying the image in the real space 3. Specifically, each step of a flowchart of FIG. 8 can be performed as follows.

In the display system 20, when the input information is input from the input unit 13 in the second device 22, the second device 22 requests the captured image of the camera to the first device 21 via the communication unit 16. Based thereon, the first device 21 captures an image of the real space 3 with the camera 11 and transmits the captured image of the camera 11 via the communication unit 15 to the second device 22. In the second device 22, the video data generation unit 14 generates video data for displaying an image including the pointing image 2 based on input information input from the input unit 13 and the captured image of the camera 11. In other words, the object 5A is detected from the captured image by image recognition based on the input information, a projection position of the pointing image 2 is determined based on the detected position of the object 5A, and video data is generated. Subsequently, the second device 22 transmits the video data to the first device 21 via the communication unit 16. In the first device 21, the image indicated by the video data received from the second device 22 is projected by the projector 12 to the image capturing region R1 of the camera 11 in the real space 3.

Therefore, the display system 20 of Embodiment 3 can display the pointing image 2 in the real space 3 in the same manner as in Embodiment 1, and thus the same actions and effects as those in Embodiment 1 can be obtained. Also, similarly to Embodiment 1, display of various types of display modes can be performed, and can be used for various applications. Also, similarly to Embodiment 2, since the input information is input in the second device 22 that is separate from the first device 21 disposed in the real space 3, the information desired to be recognized by the user 4 can be displayed in the real space 3 by remote control in the same manner as in Embodiment 2.

Embodiment 4

Figure 11:
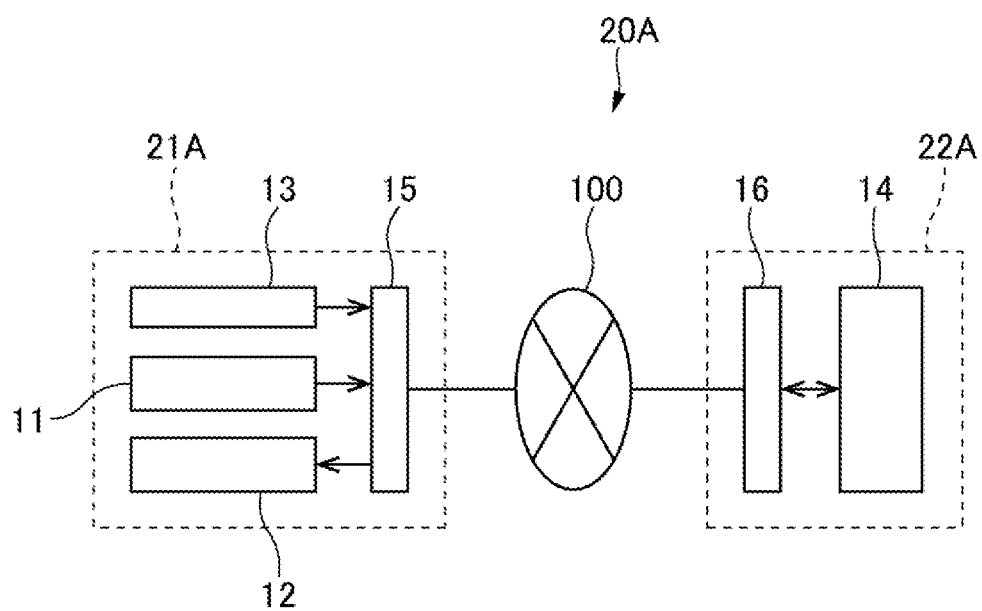
FIG. 11 is a block diagram illustrating a functional configuration of a display system according to Embodiment 4.

FIG. 11 is a block diagram illustrating a functional configuration of a display system 20A of Embodiment 4. The display system 20A includes a first device 21A and a second device 22A. The first device 21A is a projection device installed in the real space 3, or a projection device carried and used by a user. The second device 22A is capable of communicating with the first device 21A via the network 100.

The first device 21A includes a camera 11, a projector 12, an input unit 13, and a communication unit 15. The camera 11, projector 12, and input unit 13 are configured similarly to those in Embodiment 1. The second device 22A includes a video data generation unit 14 and a communication unit 16. Similar to Embodiment 3, a general-purpose personal computer can be used as the second device 22A.

Similar to the above embodiments, the display system 20A can perform a first step of capturing an image of the real space 3 in which an object is disposed with the camera 11, a second step of generating video data for projecting an image including information about the object based on the captured image, and a third step of projecting the image indicated by the video data from the projector 12 onto the image capturing region R1 of the camera 11 in the real space 3 and displaying the image in the real space 3. Specifically, each step of a flowchart of FIG. 8 can be performed as follows.

In the display system 20A, in the first device 21, an image of the real space 3 is captured by the camera 11 using the input of the input information from the input unit 13 as a trigger. The first device 21 transmits the input information and the captured image to the second device 22 via the communication unit 15. In the second device 22, the video data generation unit 14 generates video data including the pointing image 2 based on the input information and the captured image. In other words, the object 5A is detected from the captured image by image recognition based on the input information, a projection position of the pointing image 2 is determined based on the position of the detected object 5A, and video data is generated. In the first device 21, the image indicated by the video data received from the second device 22 is projected by the projector 12 to the image capturing region R1 of the camera 11 in the real space 3.

Thus, the display system 20A of Embodiment 4 can display the pointing image 2 in the real space 3 in the same manner as in Embodiment 1, and thus the same actions and effects as those in Embodiment 1 can be obtained. Also, similarly to Embodiment 1, other various types of display aspects can be displayed and can be used for various applications. Also, in the same manner as in Embodiment 1, since the input information is input in the first device 21 disposed in the real space 3, similarly to Embodiment 1, the user 4 can input information (for example, a title of a book) of a necessary object on the spot, the pointing image 2 pointing to the position of the necessary object can be displayed, and thus convenience is high.

What is claimed is:

1. A projection device comprising:
a camera configured to capture an image of a real space in which an object is disposed; and
a projector configured to project an image that is generated based on the image captured by the camera and that includes information about the object in an image capturing region of the camera in the real space, wherein
a projection optical system of the projector and an optical system of the camera are common.

2. The projection device according to claim 1, wherein a projection angle of the projector and an image capturing angle of the camera coincide with each other.

3. The projection device according to claim 1, wherein the image includes a pointing image pointing to the object disposed in the image capturing region.

4. The projection device according to claim 3, further comprising
a video data generation unit configured to generate video data for projecting the image,
wherein the video data generation unit detects the object from the captured image, and determines a projection position of the pointing image based on a position of the object in the image capturing region.

5. The projection device according to claim 4, further comprising
an input unit,
wherein the video data generation unit detects the object from the captured image based on input information input from the input unit.

6. The projection device according to claim 1, wherein the projector includes a self-light-emitting imager having a light-emitting element for each pixel.

7. The projection device according to claim 1, wherein the projection device is a portable device in which a timing of projection of the projector and a timing of capturing of the camera are synchronized, and
the projector is configured to project an image including information about the object when the object is included in the captured image.

8. A display system comprising:
a first device including a camera and a projector, wherein the projector includes a self-light-emitting imager having a light-emitting element for each pixel; and
a second device configured to communicate with the first device,
wherein the second device receives, from the first device, a captured image, captured by the camera, of a real space in which an object is disposed and generates video data for projecting an image including information about the object based on the captured image, and
the first device receives the video data from the second device, and projects the image onto an image capturing region of the camera in the real space by the projector.

9. The display system according to claim 8, wherein
the image includes a pointing image pointing to an object disposed in the image capturing region,
the second device includes a video data generation unit that generates the video data, and
the video data generation unit detects the object from the captured image, and determines a projection position of the pointing image based on a position of the object in the image capturing region.

10. The display system according to claim 9, wherein
an input unit is provided to the first device or the second device, and
the video data generation unit detects the object from the captured image based on input information input from the input unit.

11. A display method, comprising:
a first step of capturing, with a camera, an image of a real space in which an object is disposed;
a second step of generating video data for projecting an image including information about the object based on the captured image captured in the first step; and
a third step of projecting the image by a projector onto an image capturing region of the camera in the real space, wherein
a timing of projection of the projector and a timing of capturing of the camera are synchronized with each other, and
the projector is configured to project the image when the object is included in the captured image.

12. The display method according to claim 11, wherein
in the second step, an object is detected from the captured image, and a projection position of a pointing image pointing to the object is determined based on a position of the object in the image capturing region.

13. The display method according to claim 12, wherein
in the first step, the image of the real space is captured by the camera based on an input of input information about the object, and
in the second step, the object is detected from the captured image based on the input information.

* * * * *